United States Patent [19]

Bang

[11] Patent Number: 5,102,082
[45] Date of Patent: Apr. 7, 1992

[54] TILTABLE AND ROTATABLE BASE FOR A MONITOR

[75] Inventor: Bum J. Bang, Icheon, Rep. of Korea

[73] Assignee: Hyundai Electronics Ind. Co., Ltd., Icheon, Rep. of Korea

[21] Appl. No.: 616,931

[22] Filed: Nov. 21, 1990

[30] Foreign Application Priority Data

Nov. 30, 1989 [KR] Rep. of Korea ...... 18156-UM-89[U]

[51] Int. Cl.$^5$ ............................................. F16M 11/00
[52] U.S. Cl. ..................................... 248/183; 248/921
[58] Field of Search .............. 248/183, 660, 661, 133, 248/139, 178, 181, 185, 186, 278, 349, 919, 920, 921, 922, 923, 663, 664, 371, 425; 403/55, 57

[56] References Cited

U.S. PATENT DOCUMENTS

| | | | |
|---|---|---|---|
| 4,483,503 | 11/1984 | Gahan | 248/921 |
| 4,533,105 | 8/1985 | Cornwell | 248/183 |
| 4,575,033 | 3/1986 | Henneberg | 248/921 |
| 4,589,713 | 5/1986 | Pfuhl | 248/921 |
| 4,621,782 | 11/1986 | Carlson | 248/183 |
| 4,645,153 | 2/1987 | Granzow | 248/178 |
| 4,738,422 | 4/1988 | Matheson | 248/183 |
| 4,781,347 | 11/1988 | Dickie | 248/183 |
| 4,852,830 | 8/1989 | Howard | 248/183 |

FOREIGN PATENT DOCUMENTS 60-166034  11/1985  Japan .
1-48695     3/1989  Japan .

*Primary Examiner*—Ramon O. Ramirez
*Assistant Examiner*—Robert A. Olson
*Attorney, Agent, or Firm*—Burns, Doane, Swecker & Mathis

[57] ABSTRACT

A tiltable and rotatable base assembly for a monitor includes a substantially rectangular base plate, a rotatable plate having a semi-spherical shaped well for tiltably receiving a semi-spherical shaped bottom wall of an upwardly opening box-like housing, the semi-spherical shaped two portions having approximately the same curved rate. When the monitor is rotated for adjusting the degree of rotation, the box-like housing and the rotatable plate are rotated simultaneously with respect to a support plate on which the rotatable plate and the box-like housing are mounted one above the other. When it is desired to tilt the monitor, the box-like housing is tilted in the semi-spherical well. A detent protrusion is provided for successively detentable engaging with the bottom of the rotatable plate.

2 Claims, 3 Drawing Sheets

TILTABLE AND ROTATABLE BASE FOR A MONITOR

BACKGROUND OF THE INVENTION

This invention relates to a positioning apparatus and more particularly to base support apparatus for adjusting the degree of tilt and rotation of a monitor.

Tiltable and rotatable bases have been used for many years in a wide variety of monitor application, but such bases have for the most part been relatively complex, which results in an increase of costs and lowering in work efficiency. Furthermore, the adjustment of the degree of tilt and rotation and maintenance of the adjusted position is not accomplished easily.

Accordingly, it is an object of the present invention to provide monitor base support for adjustment of the monitor viewing angle which is of simple construction, thus inexpensive to construct and easy to assemble.

It is an another object of the present invention to provide a tiltable and rotatable base support which provides a wide range of monitor viewing angle adjustment.

It is still another object of the present invention to provide a tiltable and rotatable base support which positions the monitor in the desired tilt and rotated position with maximum stability over a long period of use.

SUMMARY OF THE INVENTION

The above objects of the present invention are achieved in a preferred embodiment of the present invention which includes an assembly having a base and a locking member. The base includes a rotatable circular plate having a curved concave well for receiving and retaining tiltably and upwardly opening curved housing. The locking member includes a downwardly extending cylindrical protrusion in alignment with a central boss in a bottom plate for fittingly receiving the same. Since the upwardly opening curved housing includes a curved bottom, the curved concave well is correspondingly formed in a curved configuration.

The objects and features of the present invention are set forth with particularly in the appended claims. The present invention may be best understood by reference to the folling description, taken in connection with the accompanying drawings in which like numerals indicate like parts.

DETAILED DESCRIPTION OF THE PREFERRED EMBODIMENT

Figure 1:
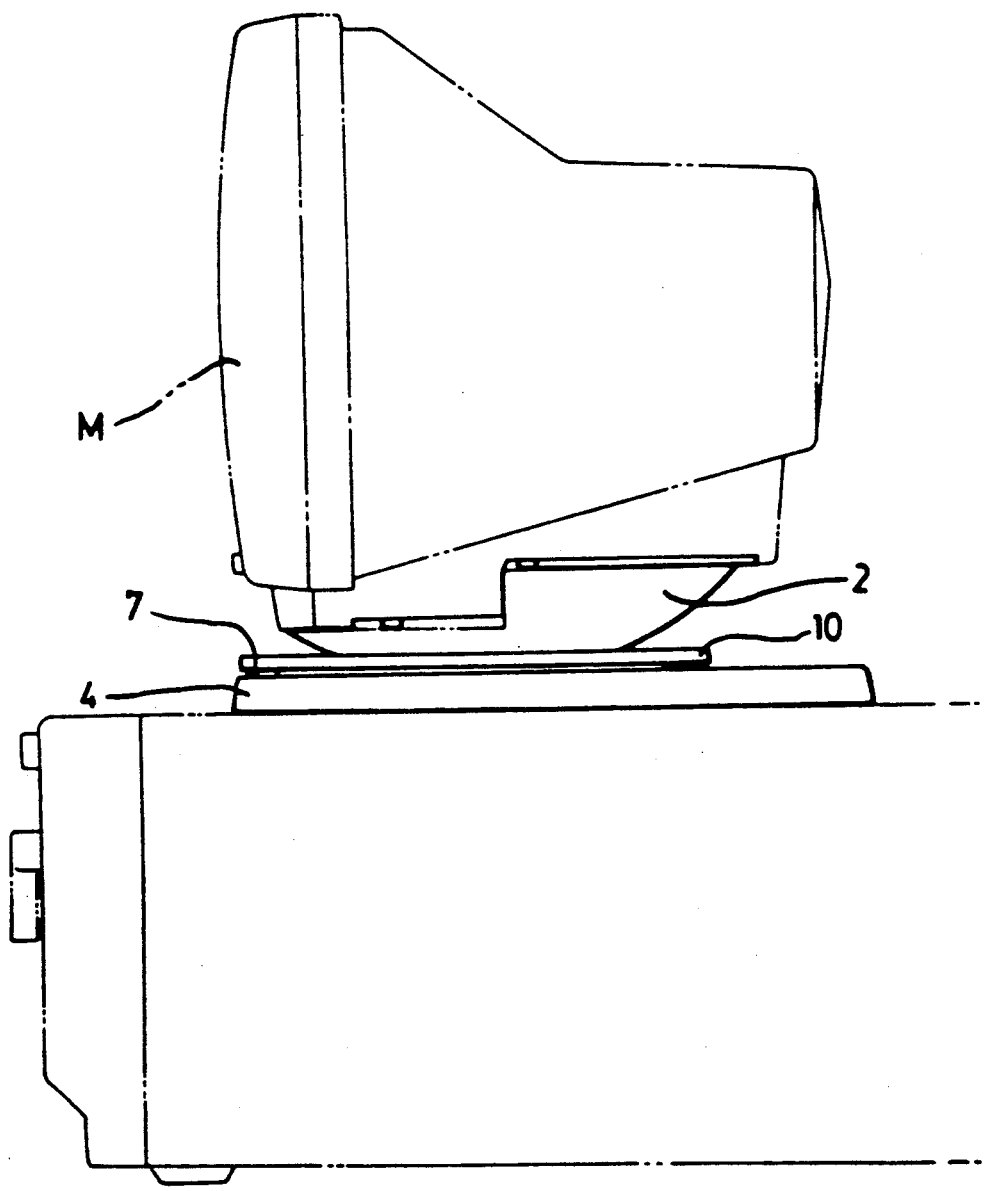
FIG. 1 is a perspective view of the tiltable and rotatable base assembly of the present invention as utilized with a monitor.
Figure 2:
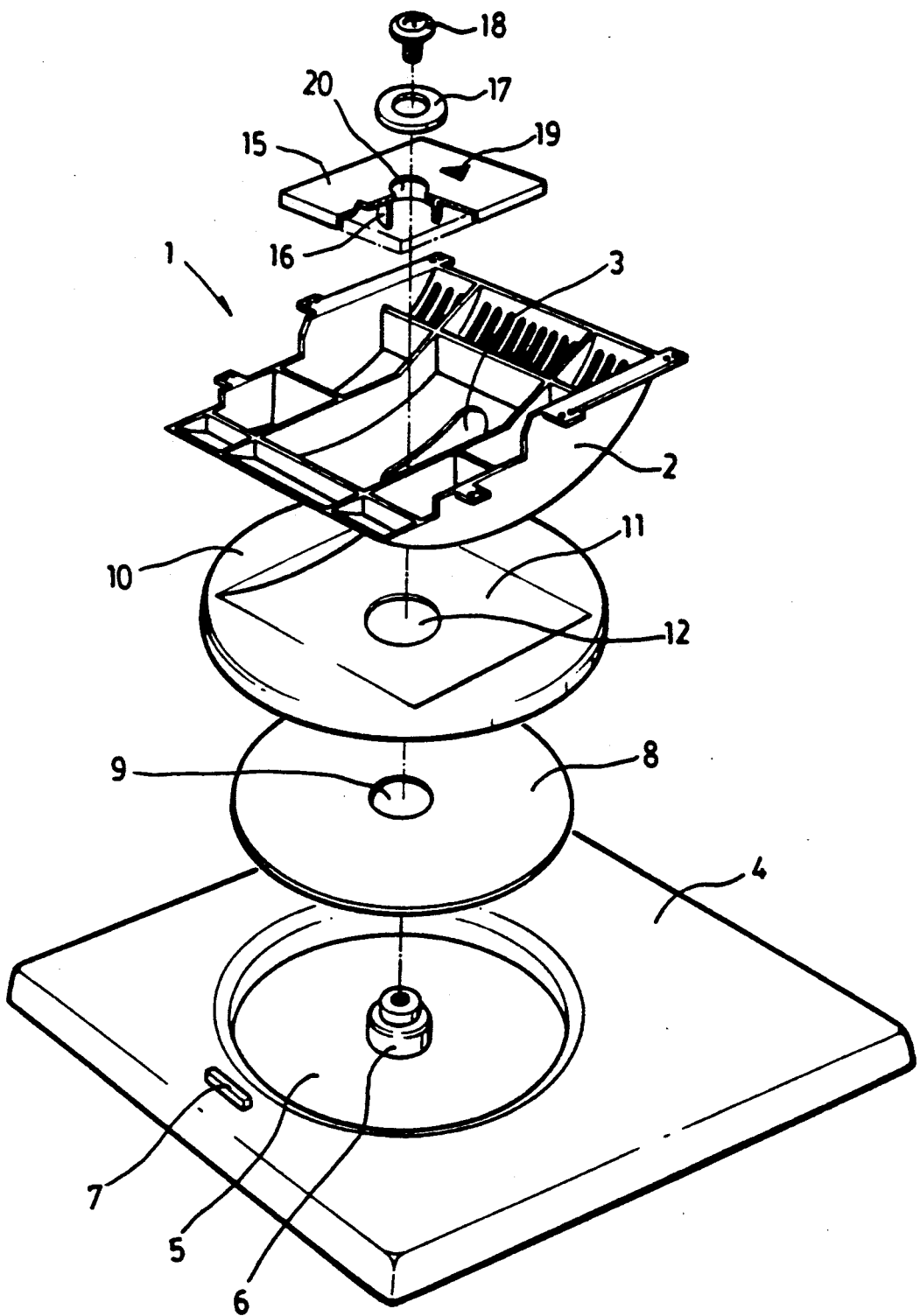
FIG. 2 is an exploded perspective view of the tiltable and rotatable base assembly of the present invention.

Referring to the drawings, the tiltable and rotatable base assembly of the present invention comprises a rectangular plate 4 having a central circular groove 5 for fittingly receiving a circular support plate 8. The circular support plate 8 is constructed of a high friction material such as nylon resin for providing suitable frictional resistance when the rotational angle of the monitor is adjusted. Extending upwardly from the mid-region of the circular groove 5 is a boss 6 having a central tapped opening for receiving a screw 18. A lateral detent protrusion 7 is provided on the rectangular plate 4 in front of the circular groove 5.

The circular support plate 8 has a circular opening 9 in the mid-region thereof through which the boss 6 is extended upwardly. Above the circular support plate 8 and the lateral detent protrusion 7 a rotatable circular plate 10 which is of larger diameter than that of the circular support plate 8 is rotatable mounted.

Figure 3:
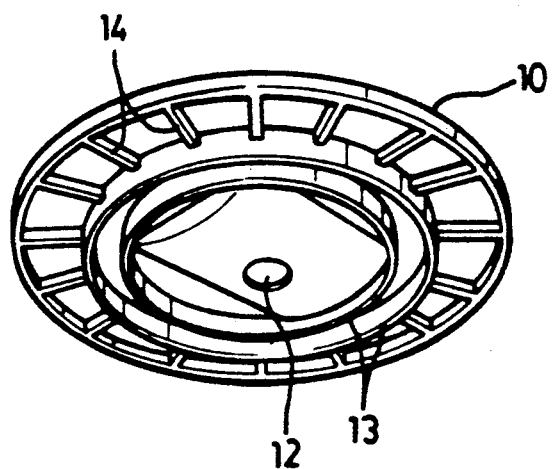
FIG. 3 is a perspective view of the bottom of the rotatable circular plate included as part of the tiltable and rotatable base assembly of FIG. 2.

The rotatable circular plate 10 also has a central opening 12 in alignment with the circular opening 9 in the circular support plate 8, through which the boss 6 passes. As particularly shown in FIG. 3, the rotatable plate 10 has a plurality of radially extending equi-distant protrusions 14 defining alternate radially extending grooves, with the distance between the protrusions 14 being approximately the same as the length of the lateral detent lug 7.

With this arrangement, the rotatable circular plate 10 is detentively rotated by successive engagement of the lateral detent protrusion 7 in the radial grooves defined by the radial protrusions 14. A plurality of axially extending annular protrusions 13 are provided inwardly of the radial protrusions 14 and are in abutment with the upper face of the circular plate 8.

A tiltable housing 1 is an integral member fixed against the bottom of the monitor by any suitable conventional fastening means and includes a hemisphere-shaped bottom 2 which can be tilted forward and backward in the concave groove. The hemisphere-shaped bottom 2 has an elongated slot 3 extending from the front to the rear end thereof through which the boss 6 is extended upwards.

Figure 4:
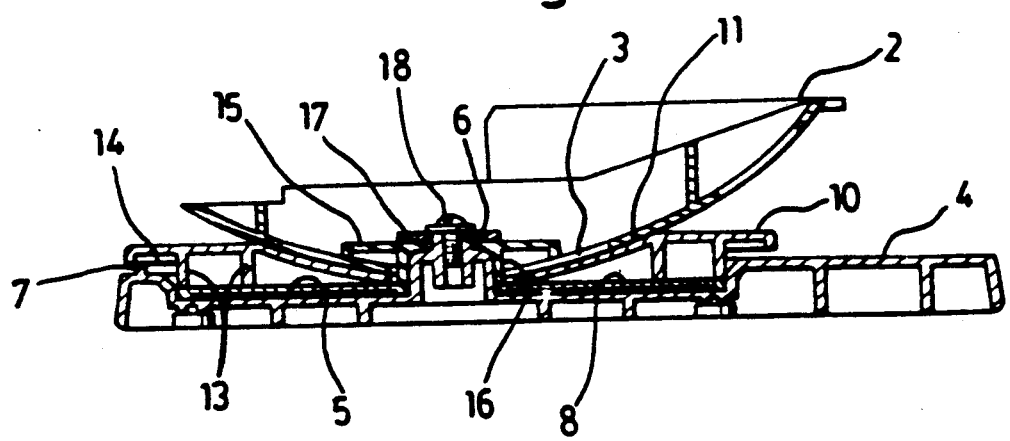
FIG. 4 is a sectional of the assembly of the tiltable and rotatable base assembly of the present invention.

A boss engaging means 15, as particularly shown in FIG. 4, is mounted over the elongated slot 3 and includes a central bore 20 in axial alignment with the elongated slot 3 for passage of the fastening screw 18 into the tapped opening in the boss 6 through a washer 17. A hollow cylindrical protrusion 16 is extended downwardly from the circumference of the central bore 20 and in alignement with the boss 6 to fittingly accomodate the same through the openings 3, 12 and 9.

A direction mark 19 is displayed on the upper face of the boss engaging means 15 for facilitating the identification of the assembly direction.

When adjustment is desired of the rotating angle of the monitor M, the operator can rotate the monitor. Upon rotating the monitor, the rotatable circular plate 10 and the hollow housing 1 rotate in unison with respect to the support circular plate 8. At this time, the annular protrusions 13 will rotate frictionally with respect to the support circular plate 8 and the radially extending protrusions 14 will rotate in successive engagement with the lateral detent protrusion 7, thus facilitating the adjustment of the rotating angle of the monitor.

To get the desired angle of tilt, the operator moves the body of the monitor rearwardly or forwardly, and upon the tilting movement of the tiltable housing 1, the housing 1 is frictionally tilted in the groove, thus providing the desired tilt position of the monitor.

While in accordance with the provisions and statutes there has been illustrated and described the best form of the invention, certain changes may be made without departing from the spirit of the invention as set forth in the appended claims and in some cases, certain features of the invention may be used to advantage without a corresponding use of other features.

What is claimed is:

1. A tiltable and rotatable base assembly for supporting a monitor for providing a wide range of operator viewing angles, said assembly comprising:

a support plate having a central opening;

a rotatable plate rotatably mounted on the support plate for adjusting the degree of rotation of the monitor and including an upper face, a bottom face, and a central opening in alignment with the central opening in the support plate, the upper face having an upwardly opening, curved semi-spherically shaped well and the bottom face having a plurality of radially extending, equi-distant protrusions adjacent the periphery thereof for rotating the rotatable plate detentably, and an axially extending annular protrusion located between the radially extending protrusions and the central opening of the rotable plate, and abutted against the upper face of the support plate;

a substantially rectangular base plate having a circular groove for mounting the support plate and including a boss having a tapped opening for engaging a screw in the assembled structure, and a lateral detent protrusion disposed forwardly of the circular groove for successively engaging a portion of the radially extending protrusions when the rotatable plate is rotated with respect to the substantially rectangular base plate for the adjustment of the degree of rotation of the monitor;

a curved semi-spherically shaped box-like housing including a central portion, a curved bottom wall dimensioned to be tiltably received in the semi-spherically shaped well in the upper face of the rotatable plate, and an elongated slot in alignment with both central openings in the substantially rectangular plate, the curved bottom wall of the box-like housing and the curved well in the upper face of the rotatable plate being dimensioned to have approximately the same curving rate;

a substantially rectangular-shaped locking member in upwardly covering relation with respect to the central portion of the box-like housing, including a central opening in alignment with the elongated slot in the box-like housing and a cylindrically shaped protrusion extending from an edge of the central opening thereof for engaging with the boss on the rectangular plate; and fastening means displaced through the locking member and being engaged with the boss through the aligned openings.

2. A tiltable and rotatable base assembly according to claim 1, wherein a direction mark is displayed on the upper face of the locking member for easy identification of the assembly direction.

* * * * *